United States Patent [19]

Barry et al.

[11] 4,375,080
[45] Feb. 22, 1983

[54] RECORDING AND EVALUATING INSTRUMENT AND METHOD FOR TEACHER EVALUATION

[76] Inventors: Patrick D. Barry, 2403 Gunwale Pl., Woodbridge, Va. 22192; Robert E. Lowrey, 143 Oliver St., Conway, Ark. 72032; Kenneth Dobbs, Canton, Okla. 73724

[21] Appl. No.: 156,503

[22] Filed: Jun. 4, 1980

[51] Int. Cl.[3] .......................... G06F 3/06; G06F 15/20
[52] U.S. Cl. .................................... 364/551; 364/715; 434/238
[58] Field of Search ............... 364/715, 551, 554, 419, 364/900; 434/108, 238, 362; 235/92 PD, 92 MT, 92 T

[56] References Cited

U.S. PATENT DOCUMENTS

| | | |
|---|---|---|
| 935,661 | 10/1909 | Johnson . |
| 1,132,308 | 3/1915 | Dempster . |
| 1,138,226 | 5/1915 | Kenney . |
| 1,284,521 | 11/1918 | Williams . |
| 1,961,170 | 6/1934 | Robinson . |
| 2,181,728 | 11/1939 | Greentree ............................ 235/92 |
| 2,398,988 | 4/1946 | Ziebolz ................................. 364/554 |
| 2,918,730 | 12/1959 | Schrade ................................ 434/238 |
| 3,685,169 | 8/1972 | Blau et al. ........................... 434/362 |
| 3,781,901 | 12/1973 | Morrison ................................. 346/1 |
| 3,784,979 | 1/1974 | Friedman et al. ................... 434/350 |
| 4,012,852 | 3/1977 | Journot et al. ...................... 434/362 |
| 4,118,783 | 10/1978 | Collins ................................. 364/734 |
| 4,168,525 | 9/1979 | Russell ................................. 364/554 |
| 4,179,611 | 12/1979 | Mill et al. ......................... 235/92 PD |
| 4,220,992 | 9/1980 | Blood et al. ........................ 364/410 |
| 4,247,895 | 1/1981 | Weber ................................. 364/419 |

OTHER PUBLICATIONS

"Microprocessors and Microcomputer Systems" by Rao. Van Nostrand Reinhold Co., Chapters 7 and 10, (1978 Text Book), pp. 81–118 and 154–160.

*Primary Examiner*—Charles E. Atkinson
*Attorney, Agent, or Firm*—Cushman, Darby & Cushman

[57] ABSTRACT

In a recording and evaluating instrument and method for teacher evaluation, observation and the recording of classroom activities is prompted by a display device controlled by an interval timer, the timing interval of which is preselected by the observer. The observer depresses a key of a keyboard corresponding to the observed activity. A computer receives the observer's keyboard entry, and supplies the information to a control circuit which controls the operation of a stylus mechanism and a paper advance mechanism for providing a complete and permanent record of consecutive observed activities. The computer also counts the number of observed and recorded activities, and determines the percentage of activities corresponding to each of a plurality of predetermined activity categories. At the end of the period of evaluation, the number of observed and recorded activities and the percentages in each category are displayed by a numeric display device.

20 Claims, 9 Drawing Figures

RECORDING AND EVALUATING INSTRUMENT AND METHOD FOR TEACHER EVALUATION

BACKGROUND OF THE INVENTION

This invention relates to recording and evaluating instruments and methods, and more particularly to recording and evaluating instruments and methods for facilitating interaction analysis in a student-teacher environment, especially for the purpose of teacher evaluation.

It is believed that a teacher's skill is measurable as a function of the teacher's contribution to a suitable learning environment and the quality of the material presented to the students. The latter parameter is within the province only of specialists in the several subject matter fields. According to one known approach, interaction analysis, the former parameter is determinable through the application of suitable instruments and related methods.

It is believed that a teacher's contribution to a suitable learning environment is understood from a measurement of behaviorial changes in the classroom as reflected in teacher-student interpersonal communication. The specific behavorial patterns that are relevant to interaction analysis are those interpersonal communications which have been determined to be meaningful to the learning experience: teacher demonstrations of interpersonal understanding, genuiness, and positive regard for student self-image. Aspy, D. N., *Toward a Technology for Humanizing Education*, Champaign, Ill., 1972, p. 118. The utility of these behavorial patterns is based on the student's need for understanding-level training, which involves the teaching of concepts and is to be contrasted with memory level training (rote memory exercises). Among the various means for evaluating classroom interaction (see Dorich, G. D. and Madden, S. K., *Evaluating Classroom Instruction: A Sourcebook of Instruments*, Reading, Ma., 1977) Flanders' matrix analysis is perhaps the best known. According to Flanders, teacher influence may be restrictive and direct or expansive and indirect. Restrictive, direct influence such as lecturing and expression of teacher opinion results in dependent behavior by the student. Expansive, indirect influence, such as teacher questioning that incites student response and teacher clarification of student ideas, promotes understanding and academic self-reliance. Flanders, N. A., *Some Relationships Among Teacher Influence, Pupil Attitudes and Achievement*, in *Interaction Analysis: Theory, Research, and Application*, ed. by Amidon & Hough, Reading, Ma., 1967, pp. 221-222.

Although Flanders' matrix analysis is among the evaluating means most readily adaptable to administrative teacher evaluation, it involves a highly complex procedure requiring observers to be extensively trained in identifying certain coded categories. Once being able to identify the code categories and having established a suitably rhythm for observing and recording, observers must practice first with audio-video tapes and then in actual classroom environments. Observers also must meet with one another to discuss standard observation procedures.

An illustrative partly-completed matrix is shown in FIG. 1. For convenience in discussion, an event is considered to be the transition from a previously-observed activity (behavior) to a presently observed activity over a definite, predetermined interval. The matrix comprises a plurality of boxes, each identified by its respective row and column. For example, the box in the upper right corner of the matrix is identified by the designation (1, 10), where the numeral 1 represents the first row, and the numeral 10 represents the tenth column.

The procedure governing Flanders' matrix analysis is as follows. Events are recorded by hand on a matrix by transcribing tallies in respective boxes of the matrix. An observation of classroom activity is made at the end of an interval of time, measured in accordance with the observer's rhythm. The observed activity is mentally categorized and the respective column of the matrix is identified in accordance with the category selected. The category of the previously-observed activity is recalled, and the respective row of the matrix is identified accordingly. A tally is entered in the box defined by the identified row and column. In short, *previously*-identified activities are represented by category codes identified with the ordinate axis, and *presently*-identified activities are represented by category codes identified with the abscissa axis. Each event is accordingly recorded.

The first row and box (8, 8) of the matrix of FIG. 1, for example, would have been generated from the following activities having occured at some time during a period of evaluation:

| Activity Type | Followed by Activity type | Recorded in Box Location |
| --- | --- | --- |
| 1 | 1 on two occasions | (1, 1) two tallies |
| 1 | 2 | (1, 2) one tally |
| 1 | 3 on two occasions | (1, 3) two tallies |
| 1 | 4 never | (1, 4) empty |
| 1 | 5 | (1, 5) one tally |
| 1 | 6 on four occasions | (1, 6) four tallies |
| 1 | 7 | (1, 7) one tally |
| 1 | 8 on two occasions | (1, 8) two tallies |
| 1 | 9 | (1, 9) one tally |
| 1 | 10 on four occasions | (1, 10) four tallies |
| 8 | 8 on ten occasions | (8, 8) ten tallies |

For example, if 8 represents a teacher lecture, every sequence of lecture followed by lecture in one observation interval would be marked by a tally in box (8, 8). Ultimately, the evaluator compares total student behaviors with total teacher behaviors to determine the percentage of student behaviors relative to teacher behaviors in the classroom. The analyst also determines how much of the teacher's time involved direct influence (lecture, directions, opinions) and how much involved indirect influence (questions, answers, responses to answers, discussion).

Although the Flanders system is a thorough research took, it is impractical as a teacher evaluation tool because of its complexity and multiplicity. It is desirable that an instrument for recording and evaluating a teacher's contribution to a suitable learning environment be reliable and easy to use with a minimum of observer training. It is desirable that such a recording and evaluating instrument objectively identify and measure the percentages of direct and indirect teacher influence. It is also desirable that such a recording and evaluating instrument provide an accurate and durable record of the activities occurring during a period of evaluation so that an education administrator or evaluator will have concrete evidence to support an evaluation and a convenient tool with which to counsel the teacher to improve the learning environment in that teacher's classroom.

It is known in non-analogus disciplines to provide accurate and durable records of event sequences in continuous fashion by use of so-called "strip-chart" recorders. For example, U.S. Pat. No. 1,284,521, issued to Williams on Nov. 12, 1918, discloses a device for use in determining and recording the time consumed in performing various motions or acts. A stylus is moved intermittently one step at a time transversely across a record strip by depressing and releasing a finger key. Each transverse sweep of the stylus indicates only that a different task is taking place for the length of time indicated by the respective following longitudinal portion of the record line. The task is not uniquely identified. U.S. Pat. No. 1,138,226, issued to Kenney on May 4, 1915, discloses a marine speedometer which produces a graphic record of the period of time over which a particular forward or backward speed is maintained and identifies the speed. In U.S. Pat. No. 2,181,728, issued to Greentree on Nov. 28, 1939, a traffic analyzer is disclosed which counts moving vehicles and records their speeds. The passage of each axle of a vehicle produces a single respective line in a section of the record tape, the speed of each vehicle being distinguished by the length of the respective lines. Another section of the record tape contains an indication of the time during which the observed events occur.

SUMMARY OF THE PRESENT INVENTION

The preferred embodiment of the present invention not only overcomes the disadvantages mentioned above for the known means of interaction analysis, but also is advantageous as a teacher evaluation instrument for use by education administrators because it is reliable and simple to operate, produces immediate observation results, establishes the observation rhythm, and displays the dynamics of the classroom activities. It also provides a permanent record of the classroom activity observed and recorded during the period of evaluation.

The present invention is essentially a graphic descendant of Flanders' interaction analysis, Wallen's modification of Flanders, and Agazarian's sequential analysis of verbal interaction. In the preferred embodiment, observation and the recording of classroom activities is prompted by a display device controlled by an interval timer, the timing interval of which is preselected by the observer. The observer depresses a key of a keyboard corresponding to the observed activity, and the observer's entry is translated into an activity code. A stylus mechanism and a paper advance mechanism cooperate for recording the activity codes in a sequence of respective intervals of predetermined uniform duration, each interval corresponding to an entry through the keyboard. The resulting graph, which provides a complete record of the consecutive observed activities, can be interpreted for purposes of evaluation by associating the activity codes with corresponding category definitions. The stylus mechanism and the paper advance mechanism are supplemented with means for calculating the number of observed and recorded activities, and by means for calculating the percentage of activities corresponding to each of a plurality of predetermined activity categories. Means are provided for displaying the calculated number and the calculated percentages. Although this information can be manually extracted from the graph, its instantaneous availability enhances the attractiveness of the preferred embodiment as a practical teacher evaluation means.

Other objects, features, and characteristics of the present invention, as well as the method of operation and the functions of the present invention, will be apparent from the following detailed description of the preferred embodiment and the claims, with reference to the accompanying drawings.

BRIEF DESCRIPTION OF THE DRAWINGS

In the drawings, where like reference numerals designate corresponding elements, FIG. 1 (prior art) is a graphic depiction of Flanders' matrix analysis;

FIG. 3 is a block diagram of an illustrative alternative implementation of the computer module of the preferred embodiment;

DETAILED DESCRIPTION OF THE PREFERRED EMBODIMENT

Figure 1:
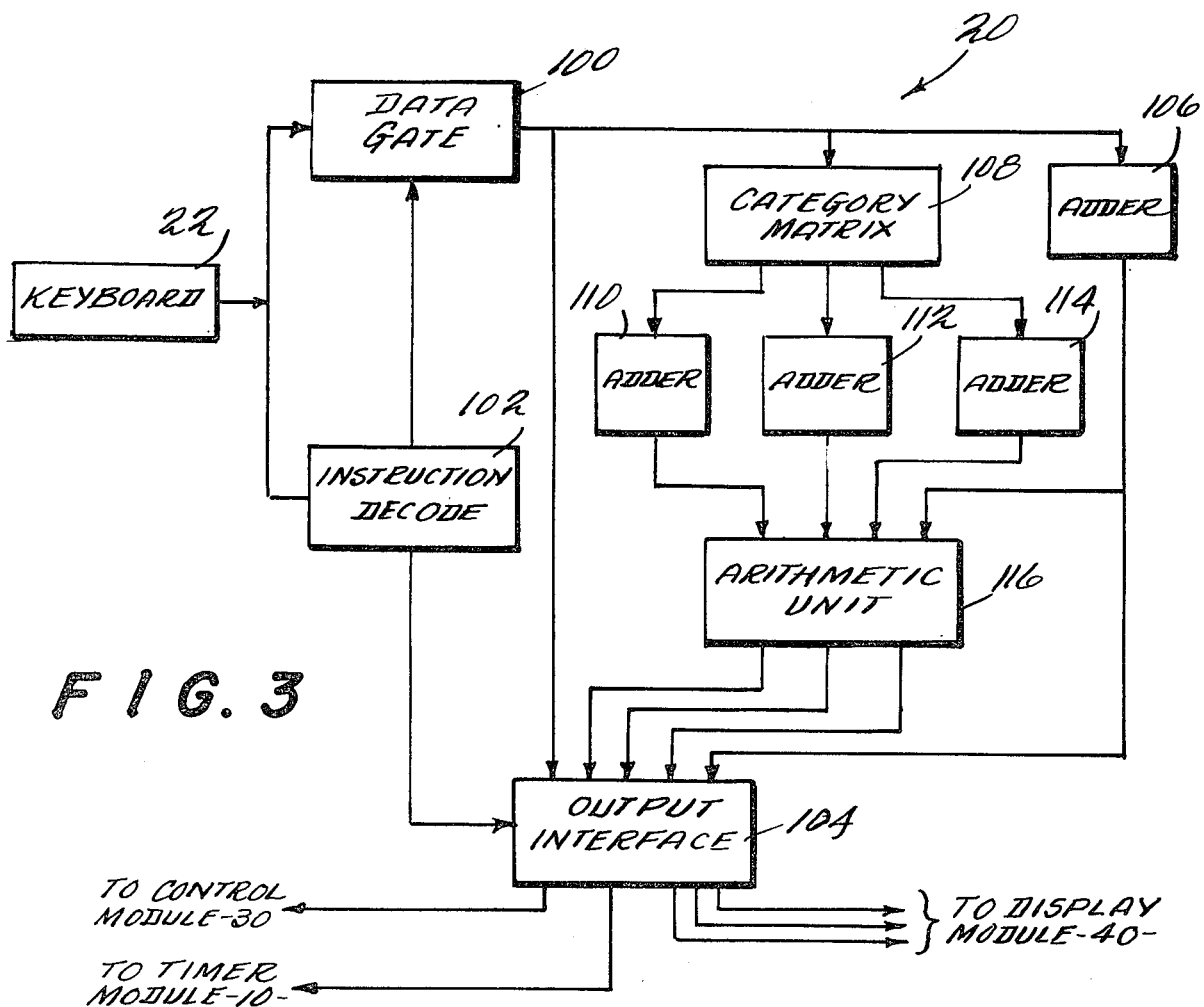
Figure 2:
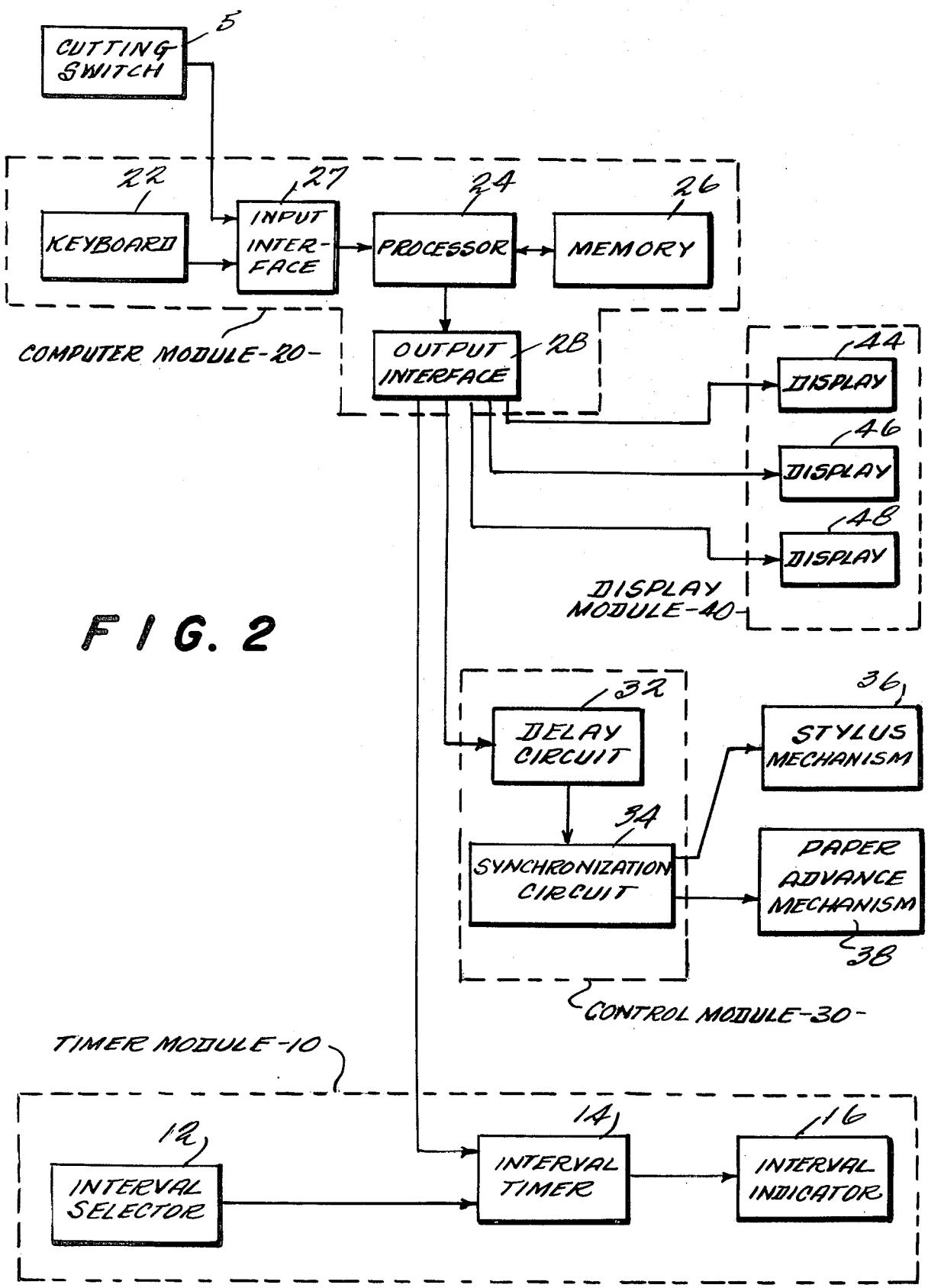
FIG. 2 is a block diagram of a preferred embodiment of the recording and evaluating instrument for interaction analysis in accordance with the present invention.

In a preferred embodiment of the recording and evaluating instrument according to the present invention, shown in FIGS. 2 and 4, an operator/observer (hereinafter "observer") presets a prompting interval. A timer module 10 is provided for this purpose. The timer module 10 comprises an interval selector 12, interval timer 14, and an interval indicator 16. The observer presets the interval selector 12 to establish the length of the interval generated by the interval timer 14. The interval selector 12 preferably comprises an interval dial 12a having a detent mechanism, for selecting any integer interval between 3 seconds and 10 seconds duration, inclusive. At the end of each interval period, the interval timer 14 activates the interval display 16, which preferably is a display lamp 16a, to prompt the observer to observe and record certain activity as hereinafter described. Suitable selectors, timers and displays are well known in the art and need not be described in further detail.

A computer module 20 (of conventional design, e.g., see chapter 7 of "Microprocessors and Microcomputer Systems" by Rao, Litton Educational Publishing, Inc., 1978) is provided for suitably receiving and processing information. The computer module 20 comprises a keyboard 22, a processor 24, a memory 26, an input interface 27, and an output interface 28 (FIG. 2). Instructions and data are entered by means of the keyboard 22 to the processor 24 through input interface 27. The processor 24 controls external circuitry through output interface 28.

The observer initiates a period of evaluation by depressing a suitable key of the keyboard 22, whereby a signal issues indicating that a "start run" instruction has been given. The start run signal is received by the processor 24, which in response initializes the interval timer 14, the memory 26, a stylus mechanism 36, and a paper advance mechanism 38. In response, the interval timer 14 is reset and begins to count a preset interval of time. At the end of that preset interval, the interval timer 14 activates the interval display 16 for prompting the observer to observe the current classroom activity and to depress a corresponding activity key.

Figure 4:
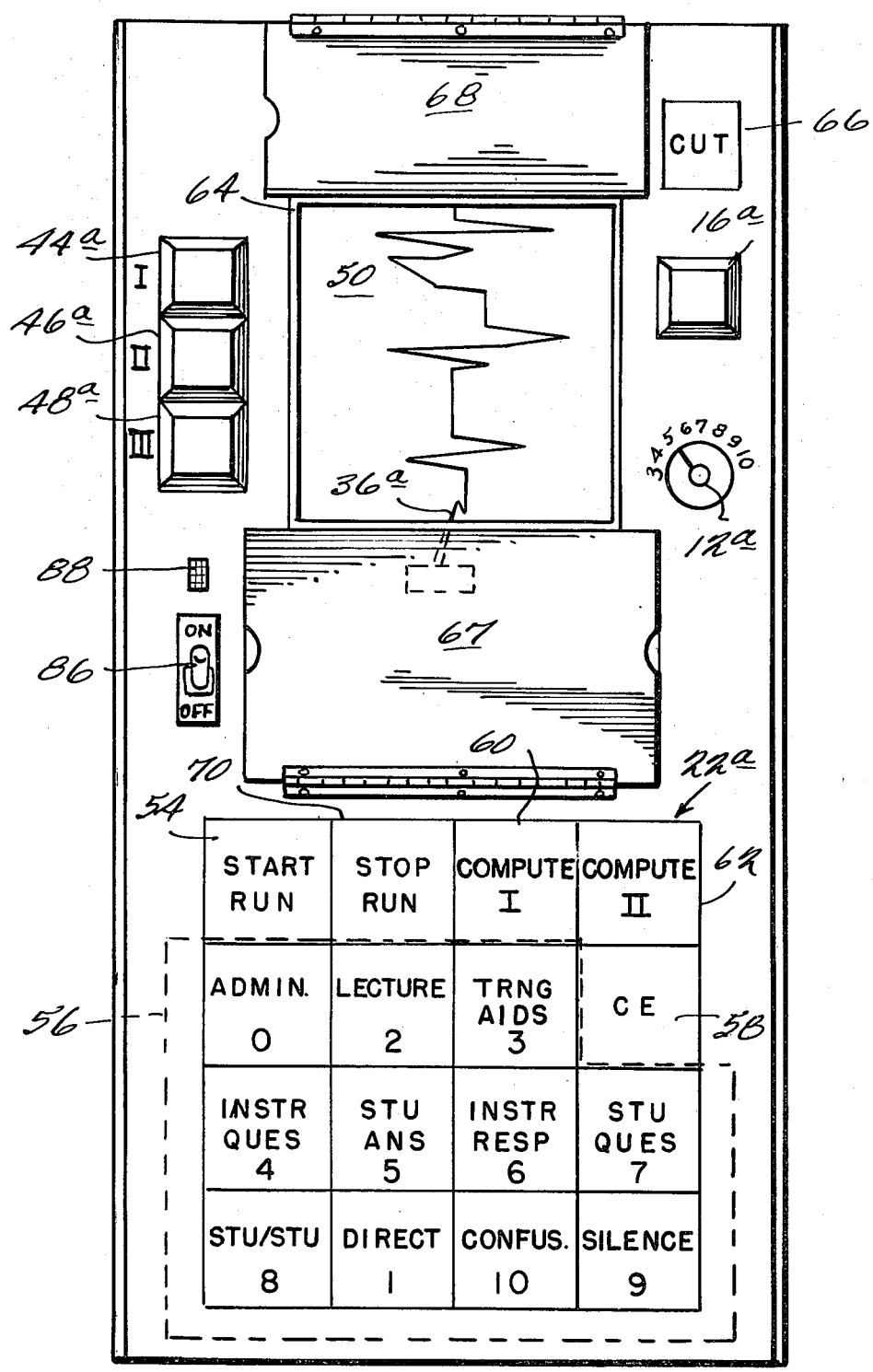
FIG. 4 is a pictorial representation of the control and display components of the preferred embodiment.

Turning briefly to FIG. 4, a 4-by-4 keyboard pad 22a is preferred for use in the preferred embodiment. A "start run" key 54 issues a "start run" signal when depressed. The activity keys are indicated generally by the numeral 56, the other keys of keyboard 22a being instruction keys. The function of the "stop run" key 70, "compute I" key 60, "compute II" key 62, and "clear entry" key 58, along with the function of the activity keys 56, are described hereinafter.

Each depression of an activity key 56 causes the processor 24 to implement a programmed sequence of events. The processor 24 counts the number of observed and correctly entered activities (activity count), categorizes the activities and counts the number of activities corresponding to each of a plurality of predetermined categories (category counts), consecutively initiates strip chart recording of the respective activity codes, provides a visual indication of the respective activity codes, and resets the interval timer 14.

The processor 24 cooperates with a memory 26 to obtain the activity count and the category counts. The keyboard 22 generates an activity code when any one of the activity keys is depressed, a unique activity code being associated with each activity key 56. Having received an activity code, the processor 24 retrieves an "activity" parameter indicative of the number of observed activities from the memory 26. The processor 24 increments this parameter by one and stores the resulting count in the memory 26. The processor 24 also categorizes the activity code received. In the present invention, there are preferably three categories, as explained hereinafter. Having categorized the received activity code, the processor 24 retrieves the appropriate category parameter from the memory 26, increments it by one, and stores the resulting count in memory 26. The activity parameter and the three category parameters are set to zero when the memory 26 is initialized.

The processor 24 also transmits a reset signal to the interval timer 14 in response to a received activity code. Once reset, the interval timer 14 turns OFF the interval display 16 and begins to count a preset interval of time.

The processor 24 also supplies the received activity code to a control module 30 and thereby to a stylus mechanism 36 and a paper advance mechanism 38. The circuitry and operation of the control module 30 is described hereinafter.

During a period of evaluation, the processor 24 responds to signals from certain instruction keys to cancel erroneously-entered activities and to temporarily suspend processing. After a period of evaluation is ended, the processor 24 responds to certain other instruction keys to calculate the percentages of activities within each predetermined category as a function of the category counts and activity count, and initiates display of the activity count and the category percentages. These events are described below.

In the preferred embodiment, a capability is provided for cancelling an erroneously-entered activity and substituting a correct one. Implementation of this correction capability is largely a design consideration, since the correction capability can be programmed into the processor 24, or implemented as a hardware feature and included as part of the input interface 27 or, as described below, as a separate circuit in control module 30, by one of ordinary skill in the art. At any time during a predetermined delay period, three seconds in the preferred embodiment, the observer may cancel the last-entered activity by depressing a "clear entry" key 58 (see FIG. 4). The processor 24 will respond to a clear entry signal from the keyboard 22 to blank out a display device, described hereinafter, which provides an indication of the previously received activity code; cancel the previously received activity code; and await a new activity code. It is preferred that the delay period be determined from the moment of entry of the original, erroneously entered activity and not from the moment of entry of any subsequent replacement activity, so that the total delay will not exceed three seconds. Similarly, the correction capability should not affect the operation of the interval timer 14. The activity count and category counts should reflect entry on only the replacement activity, as if the cancelled activity had never been entered.

Figure 7:
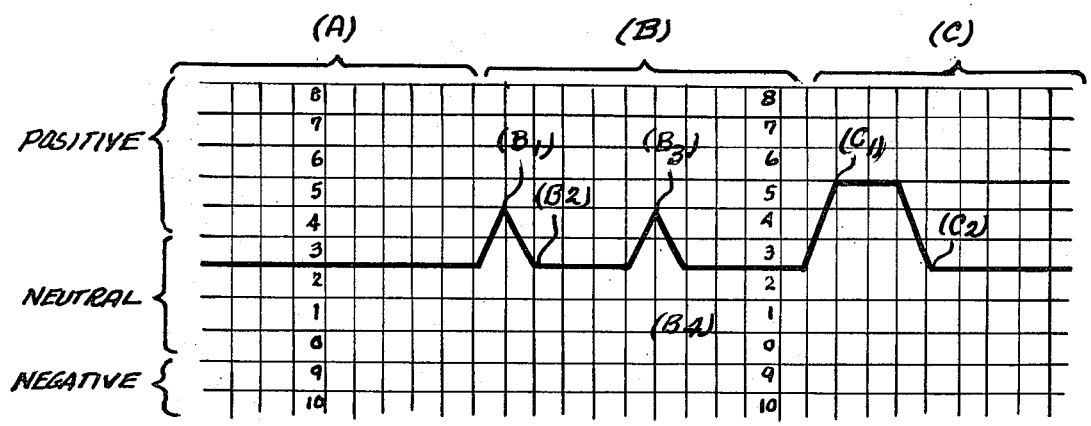
FIG. 7 is an exemplary strip chart as might be generated by the preferred embodiment, in accordance with the present invention.

It may be necessary during a period of evaluation to temporarily suspend processing. This occasion will arise when the class is disrupted by a firedrill, for example. When such an occurrance begins, the observer should depress the "stop run" key 70. In response to a stop run signal provided by the keyboard 22, the processor 24 will suspend all processing, recording, and timing activities without disrupting the current status thereof, with one exception. The processor 24 automatically signals the control module 30 to move the stylus of stylus mechanism 36 to a predetermined position, for example the "O" longitudinal line shown in FIGS. 7, 8 and 9. Processing is resumed where it was left off when the observer depresses the "start run" key 54.

The keyboard 22, the processor 24, the memory 26, the input interface 27, and the output interface 28 are well known in the art and need not be described in detail. Suitable microprocessors, memories, and input/output interfaces are commercially available as discrete components and may be combined by one of ordinary skill in the art to provide the functions of computer module 20 as hereinabove described. Suitable microcomputers, which integrate a microprocessor combined with input/output interface devices, external memory, and the other elements required from a working computer system, also are commercially available and may be adapted by one of ordinary skill in the art to provide the functions of computer module 20 as hereinabove described. The program for controlling the functions of processor 24 may be stored in read-only memory (ROM), if the microprocessor or microcomputer selected is so equipped. The selection and programming (see FIG. 6) of the components of the computer module 20 is merely a design consideration, once one of ordinary skill in the art comprehends the description herein.

Alternatively, the processor 24 may comprise several hardware processors to provide the respective functions of computer module 20, as shown in FIG. 3. Having been taught the desired functions, one of ordinary skill in the art would be able to design a number of suitable hardware configurations. One such configuration is as follows. The output of keyboard 22 is provided to a data gate 100 and an instruction decoder 102. The instruction decoder 102 is responsive to an activity code to controllably open the data gate 100 and to control the passage of information through the output interface 104 for providing suitable signals to external circuits. An adder 106 maintains a running sum of the activity count, while the category matrix 108 categorizes each activity code and increments a suitable one of the adders 110, 112 and 114. An arithmetic unit 116 receives the category counts from adders 110, 112 and 114, and the activity count from adder 106, and calculates the category percentages therefrom. The output of adder 106 and the outputs of the arithmetic unit 116 are provided to the output interface 104. The instruction decoder 102 is responsive to instructions from the keyboard 22 to suitably block the data gate 100 and issue suitable instructions to the output interface 104 for selectively providing signals to external circuits, as herein described.

The control module 30 comprises a synchronization circuit 34, and may further comprise a delay circuit 32 if it is desired to implement the delay function in the control module 30. If included, the delay circuit 32 delays transmission of an activity code to the synchronization circuit 34 for a predetermined period of time to allow the observer to correct an erroneously entered activity. It is preferred that this delay be for approximately three seconds. Once the synchronization circuit 34 receives an activity code, it coordinates the actuation of the stylus mechanism 36 and the paper advance mechanism 38, preferably a strip chart type, so that a suitable representation is made on a suitable portion of a strip chart 50 (FIG. 4). It is preferred that the paper advance mechanism 38 advance the strip chart one predetermined longitudinal interval for each observed activity recorded. It is preferred that the stylus mechanism 36 draw a substantially straight line from a present position having its ordinate corresponding to the activity code of an immediately previously entered activity, to a new position having its ordinate corresponding to the activity code of a presently entered activity and its abscissa corresponding to a one longitudinal interval increment. Thus, longitudinal movement along the abscissa axis is achieved by the relative movement of the strip chart 50 imparted by the paper advance mechanism 38. The synchronization circuit 34 determines the speed and direction of movement of the stylus mechanism 36 along the ordinate axis in accordance with the relative value of the activity code of the presently entered activity with respect to the value of the activity code of the immediately previously entered activity, in conjunction with the speed of the paper advance mechanism 38. Suitable stylus mechanisms, paper advance mechanisms, and synchronizing circuits are well known and commercially available, so that a detailed description is unnecessary. For example, any suitable strip chart recorder which comprises these elements may be used in the preferred embodiment of the present invention.

A display module 40 comprises displays 44, 46 and 48 for displaying respective activity codes during a period of evaluation and other information, described hereinafter, to the observer at the end of the period of evaluation. In the preferred embodiment, LED indicators 44a, 46a, and 48a (FIG. 4) are provided for suitably visually indicating this information to the observer. When an activity key is depressed during a period of evaluation, the corresponding activity code is numerically displayed by LED indicator 46a while LED indicators 44a and 48a remain blank. Depression of the clear-entry key 58 blanks LED indicator 46a as well until another activity is entered.

Once the evaluation period has ended, the observer must terminate the run, add certain desirable information to the strip chart 50, and remove the strip chart 50 from the instrument. Although this information could be printed directly on the strip chart 50 by providing respective suitable printing devices for displays 44, 46 and 48, it is preferable to supply this information visually to the observer. At this point, then, the "compute I" key 60 is depressed. Receiving a compute I signal from the keyboard 22, the processor 24 retrieves the activity count from the memory 26 and provides it to the output interface 28. The output interface 28 provides a signal indicative of the activity count to a suitable display, the LED indicator 44a in the preferred embodiment. LED indicators 46a and 48a remain blank. The visual indication provided by LED indicator 44a is maintained for a predetermined length of time, preferably 10 seconds, so that the observer has the opportunity to record the value in a suitable spot on the strip chart 50, thereby making a permanent record thereof. When the observer has recorded the activity count, the observer depresses the "compute II" key 62. Responding to a compute II signal from the keyboard 22, the processor 24 retrieves the three category counts from the memory 26, calculates the category percentages by dividing each category count by the activity count, and supplies the values thereof to the output interface 28. The output interface 28 provides the percentage value for the first category to LED indicator 44a, the percentage value for the second category to LED indicator 46a, and the percentage value for the third category to LED indicator 48a. These values are maintained in the respective displays 44a, 46a and 48a for a predetermined period of time, preferably 10 seconds, so that the observer has the opportunity to record them in a suitable location on the strip chart 50, thereby providing a permanent record thereof.

At the end of the final 10 second delay, the output interface 28 supplies a signal to the paper advance mechanism 38 to automatically advance the strip chart paper (approximately 2 inches, for example) so that the recorded strip chart may be removed from the instrument.

Figure 5:
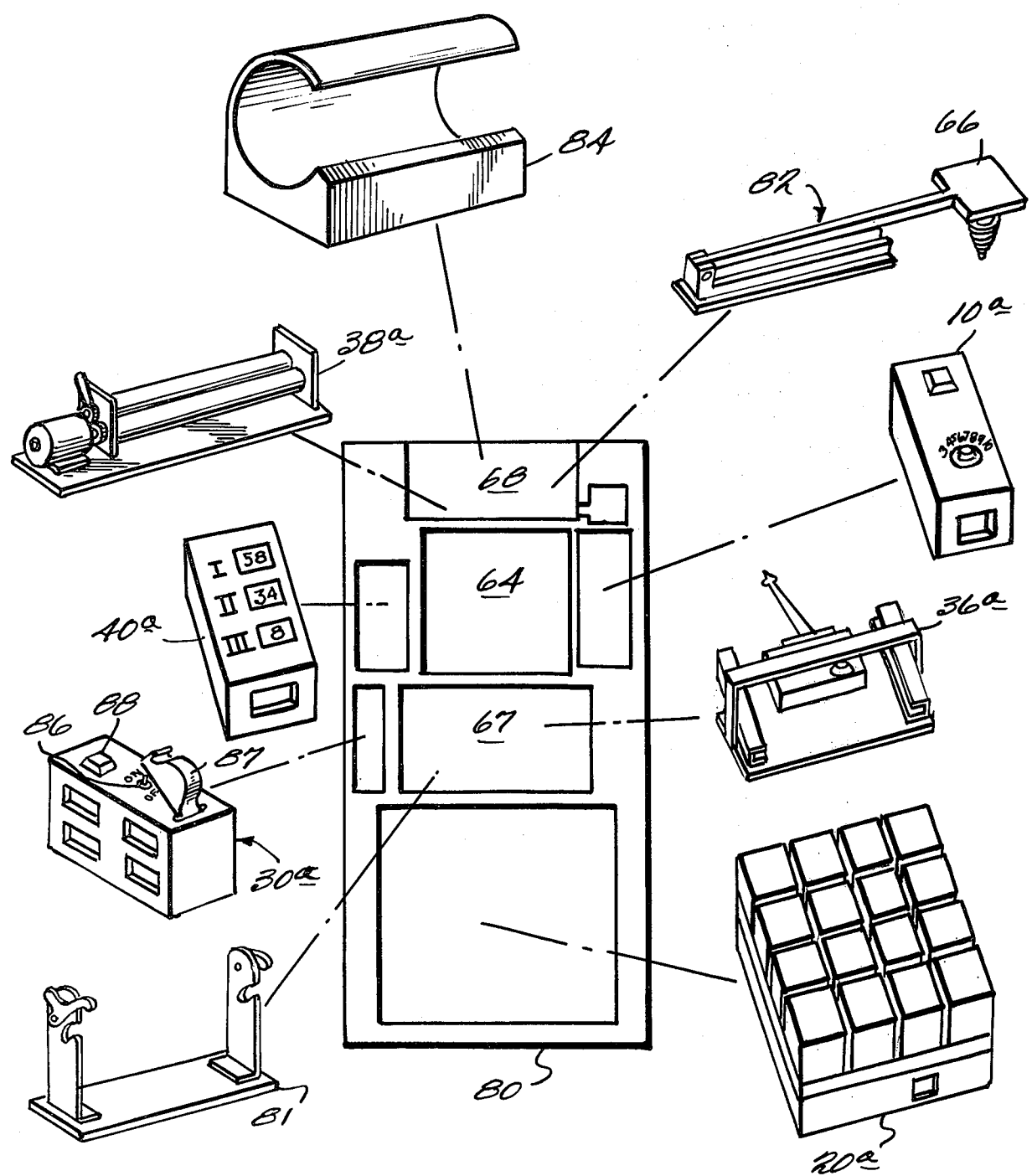
FIG. 5 is a pictorial representation of the cases enclosing the respective modular circuits of the preferred embodiment, showing an exemplary placement thereof in a cabinet, in accordance with the present invention.

The strip chart 50 is removed from the instrument by using a cutting mechanism. Turn to FIG. 4 and especially FIG. 5, which shows the placement of the various modules in cabinet 80. The strip chart system comprises a four-inch wide paper roll stationing device 81, similar to that used on printing calculators, having a paper advance mechanism 38a (not shown in FIG. 4). The strip chart is threaded from the stationing position in a covered holding area 67, under the stylus mechanism 36a, across a display surface 64, through the paper advance mechanism 38a in covered holding area 68, through the cutting mechanism 82 in covered holding area 68, and into a collecting tray 84 in covered holding area 68. The cutting mechanism is preferably a spring-loaded cutting blade appended to the cutting key 66. The strip chart runs between the open blade and a cutting block. After the strip chart has been automatically advanced at the end of the final 10 second period, the observer need only depress the spring-loaded cutting key 66 to separate the recorded strip chart from the supply roll. When the cutting key 66 is released, the paper advance mechanism 38 will automatically advance the strip chart paper a suitable distance beyond the cutting block so that the strip chart paper will advance smoothly during the next run. The circuit for this is shown in FIG. 2, where cutting switch 5, associated with cutting key 66, provides a signal to the processor 24, which in turn provides a suitable signal to the paper advance mechanism 38 through the output interface 28 and the control module 30 to suitably advance the strip chart paper.

Power to the instrument is controlled by switch 86. Switch 86 is provided with a suitable switch guard 87 to prevent unintentional operation, which would interrupt power and thereby destroy the contents of memory 26 while the instrument is in use during a period of evaluation. The switch 86 may not be used to temporarily suspend processing because of the effect an interruption of power has on the instrument. Rather, the stop run switch 70 should be depressed to temporarily suspend processing. A suitable indicator lamp 88 is provided to indicate that power is being applied, even if processing is suspended as a result of depression of the stop run key 70.

According to the present invention, the three activity categories, for which category percentages are made available at the end of each run, are indirect teacher influence (interaction), direct teacher influence (dominance), and student confusion and silence (negative classroom phenomenon). The instrument also makes available the total number of observed activities recorded, and a strip chart providing a complete record of consecutive class activities which is interpreted by replacing the activity code numbers indicated by the ordinate of each graph point with the corresponding activity definition. A preferred set of suitable activities, each of which are identified both phrasally and by activity code on respective ones of the activity keys 56 (FIG. 4), is as follows:

0—an administrative matter not related to the course of instruction, such as school announcements;
1—a direction given by the teacher to the class to work a problem, to rearrange desks, etc.;
2—teacher lecture;
3—teacher use of a training aid such as a map, a picture, or the blackboard;
4—teacher question;
5—student response to teacher question;
6—teacher response to student answer in which the teacher reinforces the student's participation;
7—unsolicited student question about the course of instruction;
8—discussion between two or more students indicating active interest in the subject matter;
9—silence from the teacher because of inadequate preparation or management of presentation;
10—class confusion, such as student discussion of unrelated subjects.

The category of indirect teacher influence includes the activity represented by activity codes 4 through 8. The category of direct teacher influence includes the activities represented by activity codes 0 through 3. The category of silence and confusion includes the activities represented by activity codes 9 and 10.

Figure 6:
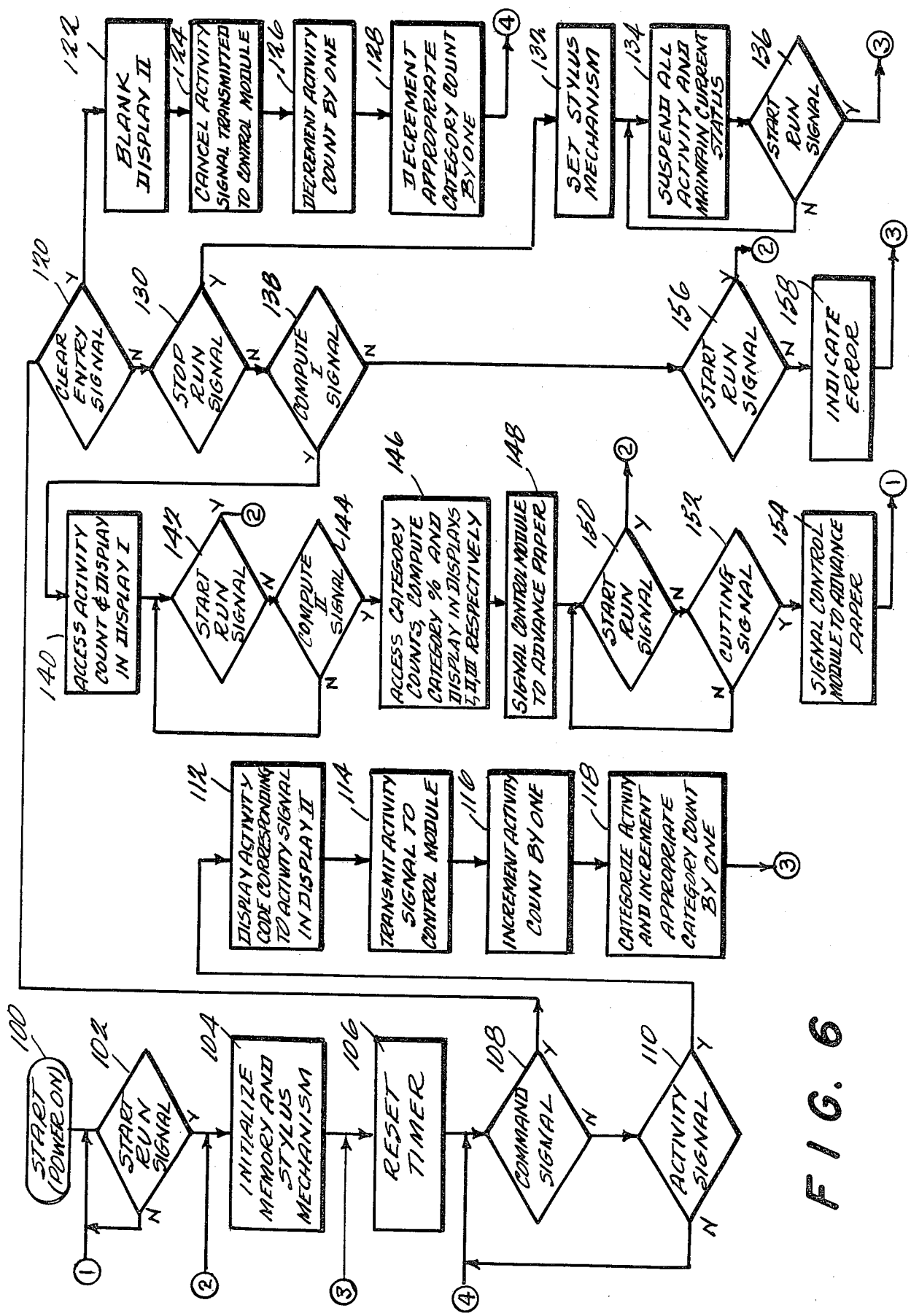
FIG. 6 is a flow diagram showing exemplary programming steps for the computer module of the preferred embodiment.

The operation of the instrument now is summarily described in the context of a specific example and with reference to FIG. 6. FIG. 6 is a flow chart showing exemplary programming steps for processor 24. Comprehending the operation of the preferred embodiment as described in detail above and summarized by example below, one of ordinary skill in the art is capable of developing the flow chart of FIG. 6 and equivalents thereof, and suitable programs therefrom, for controlling the functions of processor 24.

(1) Apply Power

By moving switch 86 from the OFF position to the ON position, the observer applies power to all components of the instrument. The guard 87 thereafter should be placed over switch 86.

(2) Begin a Period of Evaluation

The observer presets the prompting interval by setting interval dial 12a and then depress start run key 54 to begin a period of evaluation. Having received a start run signal, processor 24 sets the stylus of stylus mechanism 36a by positioning it at the "O" longitudinal line (see FIGS. 7-9), initializes memory 26, and resets interval timer 14. These operations are represented by decision step 102 and process steps 104 and 106. Step 102 represents a "wait" function wherein processor 24 awaits a start run signal from keyboard 22a.

(3A) Depress Activity Key, Correct Entry

Having observed an activity in response to a prompt from display lamp 16a, the observer depresses a corresponding activity key, for example the activity key associated with the activity code 2 (lecture). The activity code "2" is displayed by LED indicator 46a. Control module 30 responds by first delaying action for three seconds, and then synchronizing the operation of stylus mechanism 36 and paper advance mechanism 38 to draw an appropriate line on strip chart 50, as described above. The processor 24 cooperates with memory 26 to increment the activity count by one and, after categorizing the activity, incrementing the category count by one. The processor 24 also resets interval timer 14.

These operations are represented by decision steps 108 and 110, and process steps 112, 114, 116, 118 and 106. Steps 108 and 110 represent a "wait" operation wherein processor 24 awaits a signal from either an activity key or an instruction key. If an activity signal is received, steps 112, 114, 116, 118 and 106 are executed, after which processor 24 executes another wait operation.

(3B) Depress Activity Key, Incorrect Entry

Having observed an activity in response to a prompt from display lamp 16a, the observer unintentionally depresses an activity key that does not correspond to the observed activity, for example the activity key associated with the activity 2 (lecture). Assume that the observer detects the erroneously entered activity within 3 seconds. The operations set forth in paragraph 3A occur, with the exception that control module 30 is still functioning to delay action.

Having detected an erroneous entry, the observer depresses the clear entry key 58. In response, LED indicator 46a is blanked and the entry is cancelled by cancelling the signal transmitted to control module 30 and adjusting the previously incremented activity and category counts by decrementing them by one.

The observer then depresses an activity key corresponding to the observed activity, for example the activity key associated with the activity 10 (confusion). The operations set forth in paragraph 3A occur, with the exceptions that the activity code "10" is displayed by LED indicator 46a and control module 30 thereafter delays action for only the balance of the three second period before synchronizing the operation of stylus mechanism 36 and paper advance mechanism 38.

In addition to the steps mentioned in paragraph 3A, these operations are represented by decision step 120 and process steps 122, 124, 126 and 128. Steps 108 and 110 represent a "wait" operation wherein processor 24 awaits a signal from either an activity key or an instruction key. If an instruction signal is received, steps 120 et seq. are executed.

(4) Suspend Processing

Should it become desirable or necessary to temporarily interrupt a period of evaluation, the observer depresses stop run key 70 to suspend all activities while maintaining power to all modules and preserving the contents of memory 26. The stylus of stylus mechanism 36a is moved to a predetermined position, for example the "O" longitudinal line of strip chart 50 shown in FIGS. 7, 8 and 9. The operator depresses the start run key 54 to resume a period of evaluation. In response, processor 24 resets the interval timer 14 and awaits either an activity signal or an instruction signal. These operations are represented by decision step 130, process steps 132 and 134, decision step 136, and process step 106. Step 136 represents a "wait" operation wherein the processor 24 awaits a start run signal to continue processing.

(5) Terminate Period of Evaluation and Obtain Data

At the close of a period of evaluation, the observer depresses the compute I key 60. In response thereto, processor 24 retrieves the activity count from memory 26 and causes it to be displayed by LED indicator 44a for ten seconds. The observer records the value on strip chart 50, and thereafter depresses the compute II key 62. In response thereto, processor 24 retrieves the activity count and the category counts from memory 26 and calculates the respective category percentages. The resulting category percentages are displayed in LED indicators 44a, 46a, and 48a respectively for ten seconds, after which the strip chart 50 is automatically positioned for separation. The observer detaches the recorded strip chart from the supply roll by pressing cutting key 66, which also causes the strip chart 50 again to be suitably positioned, this time so that the strip chart 50 will advance smoothly during the next run.

These operations are represented by decision step 138, process step 140, decision steps 142 and 144, process steps 146 and 148, decision steps 150 and 152, and process step 154. Steps 142 and 144 represent a "wait" operation wherein the processor 24 will respond only to a compute II signal, which would normally occur, or a start run signal, which would indicate the start of a new period of evaluation. Steps 150 and 152 represent a "wait" operation wherein processor 24 awaits a signal indicative that the recorded strip chart has been separated, which would normally occur, or a start run signal, which would indicate the start of a new period of evaluation.

(6) Power Off

By opening guard 87 and moving switch 86 to the OFF position, the observer removes power from all modules.

According to the present invention, an evaluator constructs, from a study of the strip chart, a sequence of classroom activities. For example and with reference to FIG. 7, the period A indicates that the teacher lectured for a substantial amount of time without asking questions. Period B indicates that when the teacher did ask a question ($B_1$), the teacher did not give the students sufficient time to respond. Instead, the teacher lectured ($B_2$), rephrased the question ($B_3$), and then answered the question ($B_4$). Period C indicates that a student asked a question ($C_1$) about the material that had already been covered, and the teacher was forced to cover the same material a second time ($C_2$).

Figure 8:
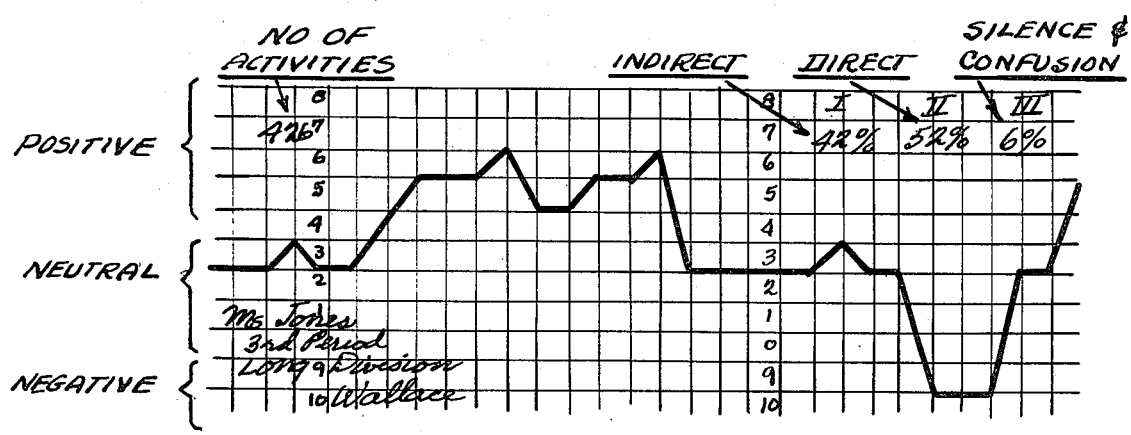
FIGS. 8 and 9 are exemplary strip charts having exemplary notes written thereon, in accordance with the present invention.
Figure 9:
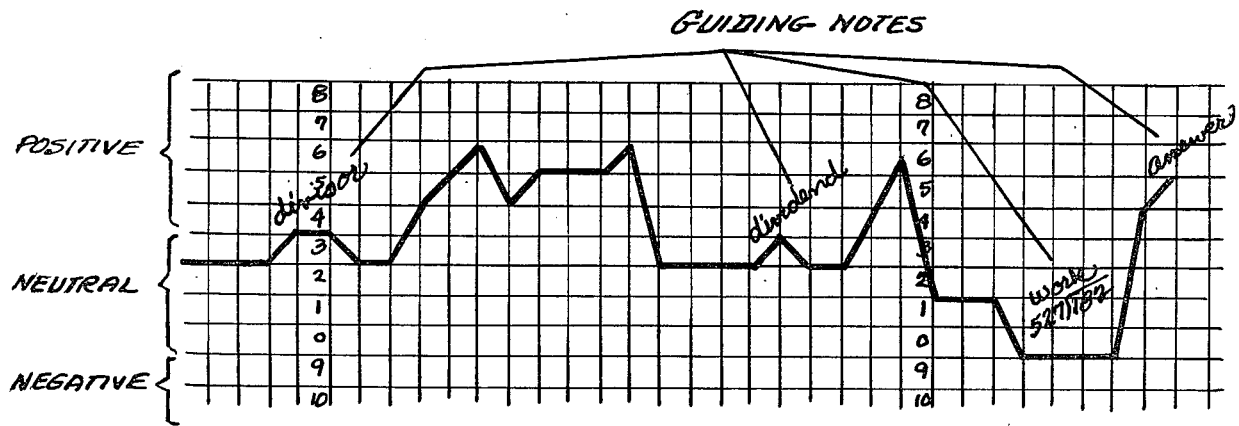

The critiquing process can be more effective if the observer makes notes on the strip chart as the observer records the class activities. It is usually desirable for the observer to record the activity count and the three category percentages provided by the instrument, but in addition the observer should record the teacher's name, the class period, the subject of the class period, and the observer's name, as shown in FIG. 8. Furthermore, it is desirable for the observer to make guiding notes on the strip chart, thereby providing both the evaluator and the teacher with a point of reference to facilitate precise and accurate recollection of class activities. Exemplary guiding notes are shown in FIG. 9.

In working with the conscientious teacher, preferably immediately following the period of evaluation, the evaluator and the teacher are able to identify the good and bad teaching behavior so that the teacher may consider specific ways of improving teaching effectiveness. In dealing with a recalcitrant teacher, the evaluator or administrator possess concrete evidence of teaching ineffectiveness which can be compared with future observations to substantiate appropriate administrative action.

While the present invention has been described in connection with what is presently conceived to be the most practical and preferred embodiment, it is to be understood that the present invention is not limited to the disclosed embodiment. Modifications may be made in the design and arrangement of the elements without departing from the spirit and the scope of the invention as expressed in the appended claims. For example, although a strip chart recorder is included in the preferred embodiment to generate the interaction graph, a suitable line printer capable of printing a suitable directed line segment may be used instead. This and other modification and equivalent structures and methods are included within the spirit and scope of the appended claims.

What is claimed is:

1. A method of collecting and displaying classroom teacher evaluation data comprising the steps of:
   generating discrete information signals at consecutive predetermined time intervals successively indicative of respective consecutive predetermined classroom activities observed by an observer in the teacher's classroom; and
   recording said discrete information signals in real time, as they are generated, in graphic form providing a permanent record of consecutive transitional events representing transitions in the observed predetermined classroom activities, each of said transitional events being represented by a line on a graph extending from a point of said graph having an ordinate corresponding to just previously received said information to a point of said graph having an ordinate corresponding to presently received said information, the abscissa of each successive such point being incremented by one predetermined interval representing one of said predetermined time intervals.

2. The method of claim 1, wherein said information is entered through a keyboard, each key of which corresponds to a particular observable activity and which generates, when depressed, an electrical signal corresponding to a predetermined respectively corresponding observed activity.

3. The method of claim 1 or 2 further comprising the steps of visually prompting said observer at each of said consecutive predetermined time interval to observe respective consecutive classroom activities and to generate said discrete information signals corresponding thereto.

4. The method of claim 1 or 2 further comprising the step of presetting said predetermined time interval.

5. A method of collecting and displaying teacher evaluation data comprising the steps of:
prompting an observer at successive predetermined time intervals to observe respective consecutive then-occurring predetermined classroom activities and to generate discrete successive information signals indicative of consecutive said predetermined classroom activities observed by said observer in the classroom;
recording said information in graphic form providing a permanent record of consecutive transitional events representing transitions in the successive observed predetermined classroom activities, each of said trasitional events being represented by a line on a graph extending from a point of said graph having an ordinate corresponding to a just previously received discrete information signal to a point of said graph having an ordinate corresponding to a presently received discrete information signal the abscissa of each successive such point being incremented by one predetermined interval representing one of said predetermined time intervals;
counting a number of respective consecutive observed predetermined activities;
determining a percentage of observed activities corresponding to each of a plurality of predetermined categories; and
displaying the results of said counting step and said determining step.

6. An apparatus for recording and displaying teacher evaluation data, comprising:
means for consecutively generating at consecutive predetermined time intervals any desired one of plural predetermined discrete information signals, each consecutive signal corresponding to and representing a respective consecutively observed predetermined classroom activity; and
means for graphically recording said consecutive discrete information signals at a sequence of respective spaced-apart intervals of predetermined uniform length, each interval corresponding to one of said predetermined time intervals.

7. An apparatus for analyzing teacher evaluation data, comprising:
means for generating consecutive discrete information signals at consecutive predetermined time intervals each of said signals corresponding to and representing a respective consecutively observed one of predetermined classroom activities;
means for counting said discrete information signals and for calculating the percentage of each of plural said observed predetermined classroom activities with respect to the total number of activities thus observed over a desired period of time.

8. The apparatus of claim 7 further comprising means for displaying the counted number and said calculated percentages.

9. The apparatus of claim 6, 7, or 8 further comprising means connected to said means for generating for consecutively prompting observation of classroom activities at the end of each of consecutive predetermined time intervals.

10. An apparatus for calculating, analyzing, and displaying teacher evaluation data, comprising:
first means for automatically repetitively prompting human observation of predetermined categories of teacher classroom activities at consecutive predetermined time intervals during a period of evaluation;
second means connected to said first means for manually generating a discrete information signal at the end of each said predetermined time interval, each signal corresponding to and representing a respective observed predetermined category of teacher classroom activities;
third means connected to said second means for consecutively graphically recording said discrete information signals in a sequence at respective intervals of predetermined uniform length, each interval corresponding to one of said predetermined time intervals;
fourth means connected to said second means for counting the number of said discrete information signals generated during said evaluation interval representing each predetermined category of activity;
fifth means connected to said second and fourth means for calculating percentages of observed categories of activities with respect to the total number of activities observed at the end of each time interval during said evaluation interval; and
sixth means connected to said fourth and fifth means for displaying said counted number and said calculated percentages.

11. An apparatus for recording and evaluating teacher-student interaction in a classroom during a period of instruction, a relatively untrained observer being present in said classroom for observing said interaction and operating said apparatus, said apparatus comprising:
an interval selector preset by said observer;
an interval timer connected to said interval selector for generating an actuation signal after an interval of time, said interval of time having a duration determined by said preset interval selector;
an interval indicator lamp connected to said interval timer and responsive to said actuation signal for prompting said observer to observe said teacher-student interaction;
a keyboard having respective keys corresponding to respective observable teacher-student interaction activities, said interval indicator further prompting said observer to actuate a respective key of said keyboard in response to an observation of an activity;
a computer connected to said keyboard and responsive to an output signal thereof indicative of an observed activity for counting a number of observed activities, for categorizing each observed activity according to a plurality of predetermined categories and determining the percentage of observed activities in each of said categories, and for resetting said interval timer to begin measuring said interval of time, said interval time further being connected to said computer therefor;
a control circuit connected to said computer;
a recording mechanism connected to said control circuit;

a paper advance mechanism connected to said control circuit; said control circuit being responsive to an output signal of said computer indicative of an observed activity for coordinated control of said recording mechanism and said paper advance mechanism to draw a line on a recording medium indicative of a transition from a just previously observed activity to a presently observed activity; and at least one numeric display connected to said computer for displaying said number of observed activities and said percentage of observed activities in each of said categories.

12. The apparatus of claim 11, wherein said computer comprises:

a microprocessor;

an input interface connected between said keyboard and said microprocessor;

an output interface connected between said microprocessor and said interval timer, said control circuit, and said numeric display devices; and a memory connected to said microprocessor.

13. The apparatus of claim 12, wherein said microprocessor comprises read-only memory (ROM), a program for controlling said microprocessor residing therein.

14. The apparatus of claim 11, wherein said computer comprises:

circuit means for decoding output signals of said keyboard;

circuit means responsive to said decoding means for gating output signals of said keyboard indicative of an observed activity;

circuit means responsive to said gating means for counting said number of observed activities and determining said percentage of observed activities in each of said catetories; and circuit means responsive to said decoder means and said gating means for providing signals to said control circuit indicative of observed activities; responsive to said decoder means and said counting and determining means for providing signals to said display devices; and responsive to said decoder means for providing signals to said interval timer for resetting said interval timer.

15. The apparatus of claim 11, 12 or 14 wherein said control circuit comprises a synchronization circuit.

16. The apparatus of claim 11, 12 or 14 wherein said control circuit comprises a delay circuit and a synchronization circuit, said stylus mechanism and said paper advance mechanism being connected to said synchronization circuit, and said delay circuit being connected between said computer and said synchronization circuit for delaying the response of said synchronization circuit to the output signal of said computer indicative of an observed activity by a predetermined delay period, said keyboard further having a clear entry key and said delay circuit further being responsive to an output signal of said computer during said delay period indicative of actuation of said clear entry key by said observer in response to a mistaken entry for replacing erroneous information obtained from an output signal of said keyboard indicative of a presently observed activity with correct information obtained from an immediately following input signal of said keyboard indicative of a presently observed activity.

17. The apparatus of claim 11, 12 or 14, wherein said computer delays supplying an output signal to said control circuit for a predetermined delay period, said keyboard further having a clear entry key and said computer further being responsive to an output signal of said keyboard during said delay period indicative of actuation of said clear entry key by said observer in response to a mistaken entry for replacing erroneous information obtained from an output signal of said keyboard indicative of a presently observed activity with information obtained from an immediately following output signal of said keyboard indicative of a presently observed activity.

18. The apparatus of claim 11, 12 or 14, wherein said keyboard further comprises a stop run key, said computer further being responsive to an output signal of said keyboard indicative of actuation of said stop run key by said observer for suspending processing and maintaining the value of said number of observed activities and said percentage of observed activities in each of said categories, maintaining the position of said stylus mechanism and said paper advance mechanism, and suspending operation of said interval timer.

19. The apparatus of claim 11, 12 or 14 further comprising a cutting mechanism for separating recorded strip chart paper from unused strip chart paper, said computer further being connected to said cutting mechanism and responsive to an output signal thereof for automatically actuating said paper advance mechanism to position said unused strip chart paper.

20. The apparatus of claim 11, 12 or 14, wherein each of said numeric display devices comprises a light emitting diode (LED) display.

* * * * *